United States Patent
Brady et al.

(10) Patent No.: US 10,700,782 B2
(45) Date of Patent: Jun. 30, 2020

(54) VEHICLE-TO-VEHICLE COMMUNICATION

(71) Applicant: Intel Corporation, Santa Clara, CA (US)

(72) Inventors: Kevin Brady, Newry (GB); Ruben Trejo Calle, Dublin (IE); William Anthony Rafferty, Dublin (IE); Diarmaid O'Cualain, Dublin (IE); Jelle Sels, Dublin (IE); David Relihan, Multyfarnham (IE); Tommy Grealy, Lucan (IE); Michael O'Reilly, Dunshaughlin (IE); Keissy Guerra Perez, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/869,525

(22) Filed: Jan. 12, 2018

(65) Prior Publication Data

US 2019/0052359 A1    Feb. 14, 2019

(51) Int. Cl.
*B60Q 1/44*      (2006.01)
*B60Q 1/52*      (2006.01)
*G08G 1/16*      (2006.01)
*H04B 10/116*    (2013.01)

(52) U.S. Cl.
CPC ............. *H04B 10/116* (2013.01); *B60Q 1/44* (2013.01); *B60Q 1/525* (2013.01); *G08G 1/162* (2013.01); *G08G 1/166* (2013.01)

(58) Field of Classification Search
CPC ............................... G08G 1/0133; G08G 1/00
USPC ................ 340/425.5, 539.1, 539.11, 539.13; 701/96
See application file for complete search history.

(56) References Cited

U.S. PATENT DOCUMENTS

| | | | | | |
|---|---|---|---|---|---|
| 4,231,013 | A | * | 10/1980 | Freeman | ................ B60Q 1/441 340/479 |
| 9,928,746 | B1 | * | 3/2018 | MacNeille | ........... G08G 1/0133 |
| 2018/0065644 | A1 | * | 3/2018 | Kim | ...................... B60W 50/14 |

* cited by examiner

*Primary Examiner* — Daryl C Pope
(74) *Attorney, Agent, or Firm* — Schwegman Lundberg & Woessner, P.A.

(57) ABSTRACT

Various systems and methods for implementing an anti-collision mechanism are described herein. A system for a lead vehicle to provide a visible light communication (VLC) message to a trailing vehicle behind the lead vehicle includes a vehicle controller subsystem of the lead vehicle, to: receive from a sensor array interface, sensor data from a forward-facing sensor incorporated into the lead vehicle; determine, using a processor, from the sensor data that a hazard exists; initiate the application of brakes with a braking force; and initiate, via a light controller, a VLC message to the trailing vehicle, the VLC message including the braking force.

22 Claims, 9 Drawing Sheets

VEHICLE-TO-VEHICLE COMMUNICATION

TECHNICAL FIELD

Embodiments described herein generally relate to accident avoidance systems, and in particular, to a vehicle-to-vehicle communication.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
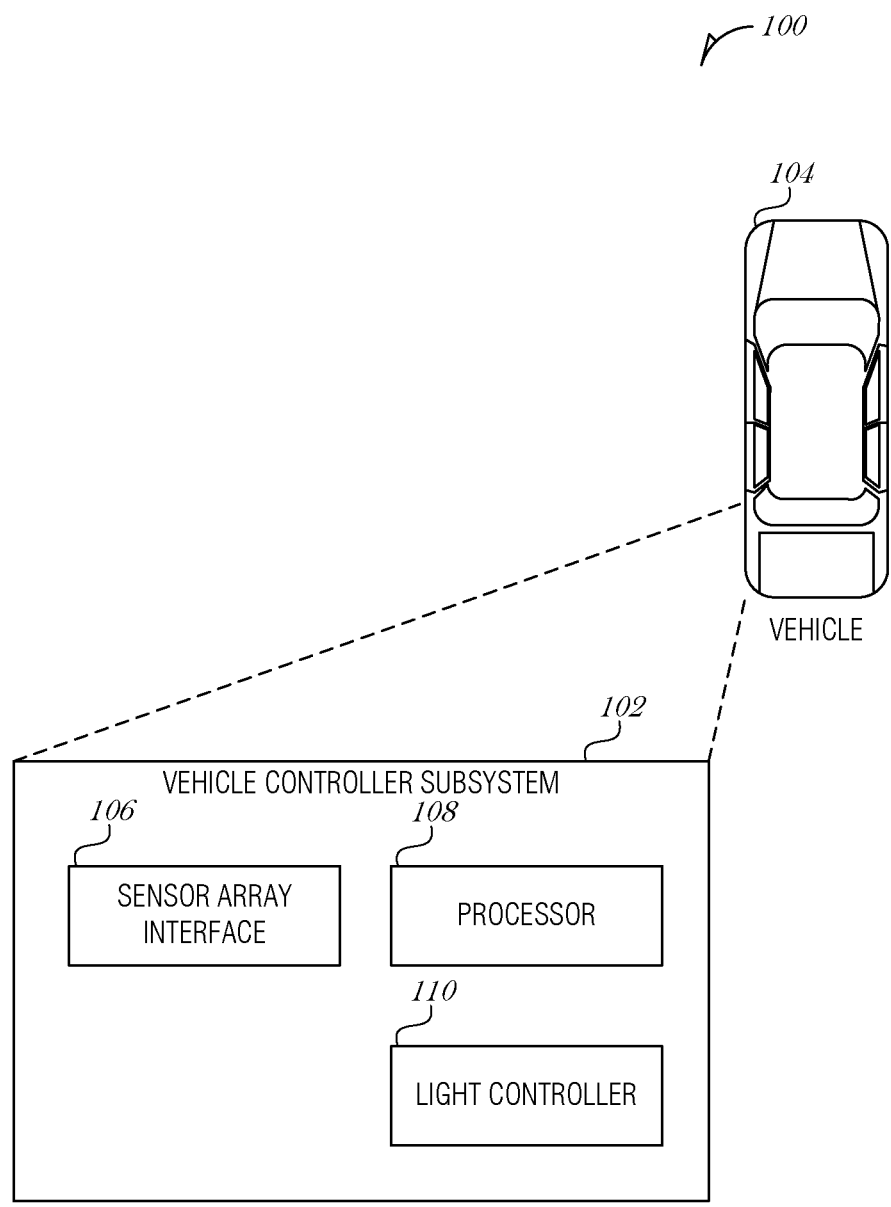
FIG. 1 is a schematic drawing illustrating a system to control a vehicle, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Many vehicle collisions are rear-end collisions, those that involve a collision between a lead vehicle and a trailing vehicle in the same lane. Brake lights only indicate that the brakes are engaged. They do not provide an indication of how much braking force is being applied. Thus, a driver in a trailing vehicle may not be able to ascertain how quickly the lead vehicle is decelerating. Further, trailing vehicles may use ultrasonic range finding or other mechanisms to measure the distance between the lead vehicle and the trailing vehicle. However, such range finding systems are only capable of measuring the lead vehicle's actual distance or deceleration. In particular, range finding systems are not able to look ahead of the lead vehicle and determine that it will slow down.

Advanced driver assistance systems (ADAS) attempt to solve some of these problems. ADAS includes various forward, sideward, and rearward facing sensors in a vehicle. The sensors may include radar, LIDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors). However, vehicles—even those with ADAS—operate independently and are not able to effectively use community information for additional safety measures. What is needed is a better way to communicate braking situations.

The systems and methods described here include an improved ADAS that may be implemented on a vehicle (lead vehicle) in front of another vehicle (following or trailing vehicle), to alert or warn the trailing vehicle of certain conditions. Using visible light communication (VLC), the lead vehicle is able to communicate information to one or more trailing vehicles. This information may be passed from one trailing vehicle to other later trailing vehicles. The information may be tagged with a time-to-live (TTL) value or a maximum number of relays. With the tag information, the information may be passed a certain number of times from the lead vehicle to one or more layers of trailing vehicles.

In various embodiments, which will be described further below, the lead vehicle may be equipped with forward-facing sensors to detect potential collisions or other obstacles in the path of the lead vehicle. If the sensors indicate a potential collision, then the lead vehicle may emit a VLC message. The message may be received by one or more trailing vehicles, which may process it and activate their own respective rear-facing lights to communicate the message or some form thereof. Additional embodiments are described below.

FIG. 1 is a schematic drawing illustrating a system 100 to control a vehicle 104, according to an embodiment. FIG. 1 includes a vehicle controller subsystem 102 incorporated into the vehicle 104.

The vehicle 104 may be of any type of vehicle, such as a commercial vehicle, a consumer vehicle, a recreation vehicle, a car, a truck, a motorcycle, or a boat, able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional (e.g., steering wheel) and non-conventional inputs (e.g., voice control).

The vehicle 104 includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle. Cameras in the sensor array may include infrared or visible light cameras, able to focus at long-range or short-range with narrow or large fields of view.

The vehicle 104 includes an on-board diagnostics system to record vehicle operation and other aspects of the vehicle's performance, maintenance, or status. The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the vehicle controller subsystem 102 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle 104 obtains sensor data via sensor array interface 106 from forward-facing sensors to detect an obstacle or potential collision hazard. The forward-facing sensors may include radar, LIDAR, visible light cameras, or combinations. Radar is useful in nearly all weather and longer range detection, LIDAR is useful for shorter range detection, cameras are useful for longer ranges but often become less effective in certain weather conditions, such as snow. Combinations of sensors may be used to provide the widest flexibility in varying operating conditions.

Based on the sensor data, a processor 108 in the vehicle controller subsystem 102 is able to determine whether a possible collision may occur. Based on this determination, the vehicle controller subsystem 102 may initiate visible light communication to one or more trailing vehicles. The processor 108 interfaces with light controller 110 to produce lights according to the configuration of the vehicle controller subsystem 102.

The light controller 110 may interface with one or more lights that are installed on the vehicle 104. The lights (not shown) may be incorporated into the taillight cluster of the vehicle 104. The lights may be in a separate housing than the taillight cluster. For instance, the lights may be in a separate light bar that is mounted in the rear window of the vehicle 104, in a light bar that is mounted under the bumper of the vehicle 104, or a light bar that is mounted on the roof of the vehicle 104. The light bar may include one or more lights that flash, blink, change intensity, or otherwise provide VLC-communication. Other implementations and placement are understood to be within the scope of this disclosure.

VLC is embodied in a variety of wireless communication techniques. VLC refers to communication techniques that utilize light sources, such as light-emitting diode (LED) lamps to broadcast messages. In many uses of VLC, the brightness or intensity of the light source is modulated faster than the human eye may observe, allowing a light source to transmit messages without a perceivable flicker to human observers. VLC may be implemented using an image sensor within a camera for receiving and processing visible (human- or camera-visible) light data. One proposal for the standardization of optical camera communications is currently being developed by the Short-Range Optical Wireless Communications Task Group for a revision of the IEEE 802.15.7-2011 specification. Embodiments described herein may conform to the standards prescribed by the specification.

The trailing vehicle may have a sensor capable of detecting the emitted signal. In this way, the light controller 110 may provide signaling directly to trailing vehicles using a reverse-facing emitter. Upon receipt of a signal, the trailing vehicle may trigger an alarm, provide automatic braking, signal vehicles behind it, or perform other collision avoidance actions.

The vehicle controller subsystem 102 may be installed as an after-market component of the vehicle, or may be provided as a manufacturer option. As an after-market component, the vehicle controller subsystem 102 may plug into the existing ADAS in the vehicle 104 to obtain sensor data and may provide the warning lights. Alternatively, the vehicle controller subsystem 102 may incorporate its own sensor array to sense following vehicles.

Figure 2:
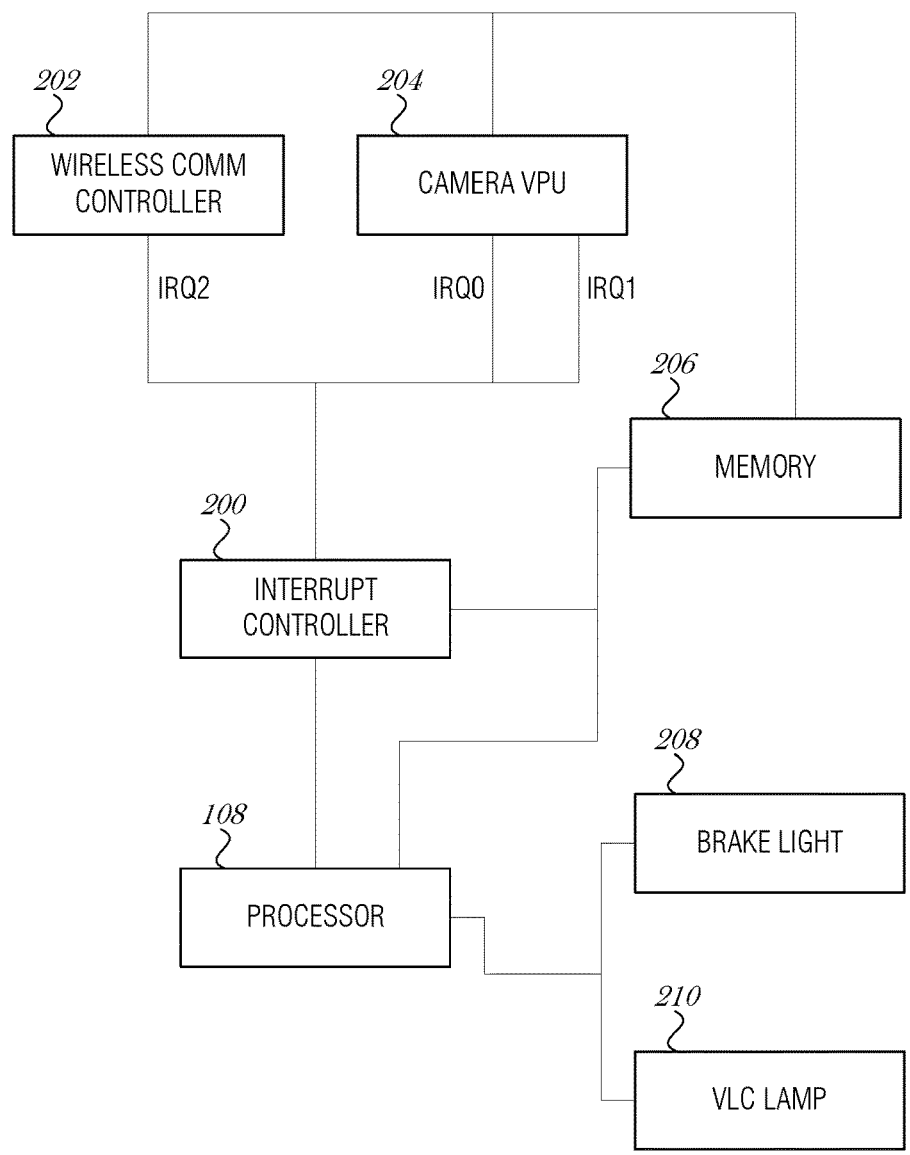
FIG. 2 is a block diagram illustrating a vehicle controller subsystem, according to an embodiment.

FIG. 2 is a block diagram illustrating a vehicle controller subsystem 102, according to an embodiment. In interrupt controller 200 is configured to operate on interrupt signals from a wireless communication controller 202 or a forward-facing camera vision processing unit (VPU) 204.

Vehicular communication systems, such as vehicle-to-vehicle (V2V) and infrastructure-to-vehicle (I2V) communication paradigms, have been proposed for use with cooperative intelligent transport systems (ITS). These systems may extend the visibility range of vehicles beyond what expensive sensors mounted onboard vehicles may achieve. Cooperative ITS may be implemented using Dedicated Short Range Communications (DSRC) or cellular-based communication (e.g., LTE). As such, the wireless communication controller 202 may be a 5G wireless controller or other radio-based controller to support vehicle-to-vehicle (V2V), vehicle-to-infrastructure (V2I), vehicle-to-anything (V2X), or other types of communication.

The wireless communication controller 202 may be in communication with other vehicles on the roadway, static installations (e.g., radio towers, roadside monitors, smart traffic lights, etc.). When a potential hazard that threatens the vehicle 104 is identified, the wireless communication controller 202 may assert an interrupt (e.g., IRQ2) to signal the interrupt controller 200.

The forward-facing camera VPU 204 is used to analyze imagery obtained from one or more forward-facing cameras. The forward-facing camera VPU 204 may obtain and analyze imagery that is captured from forward-facing cameras. If the forward-facing camera VPU 204 detects that a lead vehicle's brake lights are illuminated (e.g., the lead vehicle is braking), then the forward-facing camera VPU 204 may assert a specific interrupt (e.g., IRQ0). If the forward-facing camera VPU 204 detects a general hazard in the road or other potential hazard, then the forward-facing camera VPU 204 may assert a different specific interrupt (e.g., IRQ1) to the interrupt controller 200. General hazards may include, but are not limited to a fallen tree, an existing car accident, an animal in the road, a person crossing the road, a pothole, a disabled car blocking a lane, or the like.

When an interrupt line is asserted, a processor 108 reads status registers or memory (e.g., from memory 206), to obtain further information about the interrupt. The processor 108 applies rules and routines to determine an appropriate response. The response may be anything from alerting a driver of the vehicle 104, to applying a brake light 208 and engaging the vehicle's brakes, to using a VLC lamp 210 to communicate the hazard, or information about the hazard, to vehicles behind the vehicle 104. The VLC lamp 210 may be incorporated into the brake light 208 assembly. Optionally, the brake light 208 may be used to project VLC, and as such, may act as a VLC lamp 210. The brake light 208 may only provide VLC when actively braking to avoid confusing other drivers. Additionally, the processor 108 may transmit a signal using the wireless communication controller 202 to alert vehicles or installed monitors in the area.

This cascade of information may be provided to a limited number of vehicles. This ensures that vehicles are not bombarded with irrelevant information (e.g., a vehicle that is five miles away does not need to be informed of a deer near the road).

The vehicle 104 may transmit, to a vehicle following the vehicle 104, an indication that a vehicle in front of the vehicle 104 is braking. In addition to, or in an alternative, the vehicle 104 may transmit other information, such as the speed of the vehicle 104, the distance between the vehicle 104 and the vehicle in front of the vehicle 104, or the like.

Figure 3A:
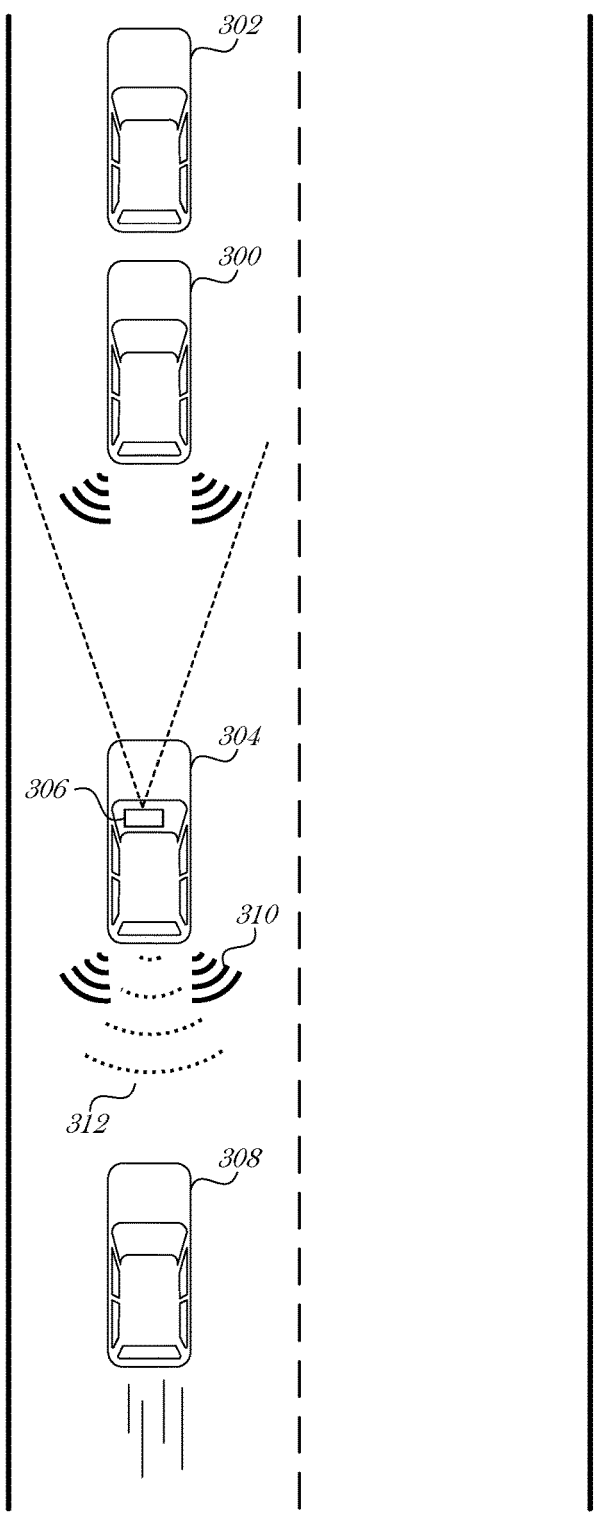
FIGS. 3A and 3B are diagrams illustrating a potential use cases, according to embodiments.
Figure 3B:
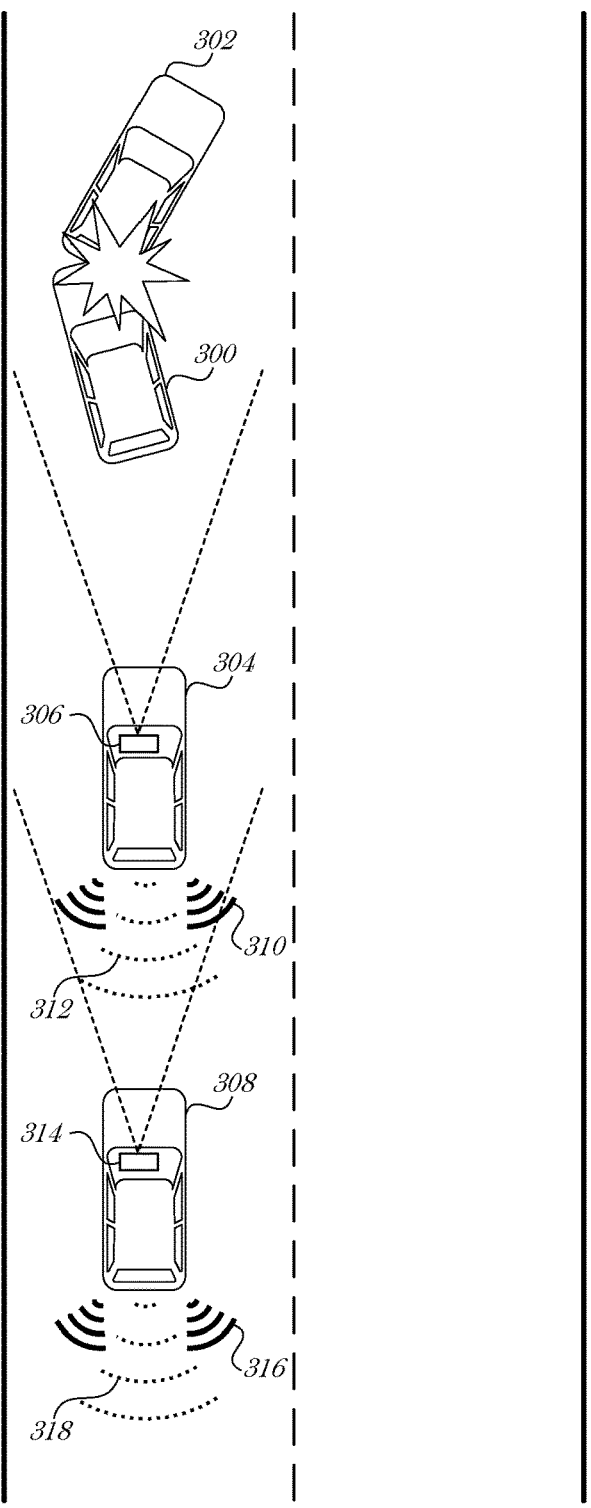

FIGS. 3A and 3B are diagrams illustrating a potential use cases, according to embodiments. In FIG. 3A, a lead vehicle 300 has its brake lights illuminated and is braking or stopped on the road. The lead vehicle 300 may be braking or stopped due to a traffic jam, a red light, a weather event, or some other situation. In the example illustrated in FIG. 3A, the lead vehicle 300 is stopped behind one or more other vehicles 302. An ego vehicle 304 is traveling and approaching the lead vehicle 300 and the other vehicles 302. The ego vehicle 304, which may also be referred to as a host vehicle, is a vehicle equipped with a forward-facing sensor system 306. The forward-facing sensor system 306 may include cameras (visible or infrared), sonar, radar, LIDAR, or the like.

A trailing vehicle 308 is following the ego vehicle 304 and the lead vehicle 300. The trailing vehicle 308 may not be able to see the lead vehicle 300 or its brake lights. The may be due to the type or size of the ego vehicle 304, the angle of travel, weather conditions, dust, or the like. In the example illustrated in FIG. 3A, the trailing vehicle 308 is not equipped with a forward-facing sensor system or other components for VLC.

In response to detecting the potential collision or other hazard of the lead vehicle 300 and the other vehicles 302, the ego vehicle 304 may activate its brake lights 310 and optionally engage its brakes to slow the ego vehicle 304. The ego vehicle 304 may also transmit one or more VLC messages 312 using the brake lights or a separate VLC lamp. In this example, the trailing vehicle 308 does not have a forward-facing camera to detect the VLC messages 312, but the driver of the trailing vehicle 308 is able to see the brake lights and reduce speed. The driver may also notice the VLC messages 312 when they are transmitted using a separate lamp from the brake lights.

In FIG. 3B, the lead vehicle 300 is involved in collision with the other vehicle 302. The ego vehicle 304 is able to detect the collision with the forward-facing sensor system 306. The ego vehicle 304 may activate brake lights 310 and brakes. In addition, or in the alternative, the ego vehicle 304 may present VLC messages 312.

In the example illustrated in FIG. 3B, the trailing vehicle 308 is equipped with its own forward-facing sensor 314 and VLC lamp to provide VLC messages. As such, the trailing vehicle 308 may illuminate its own brake lights 316, apply brakes, or transmit VLC messages 318, depending on the configuration of the trailing vehicle 308. The brake lights 316 and VLC messages 318 may be used to alert vehicles behind the trailing vehicle 308.

Figure 4:
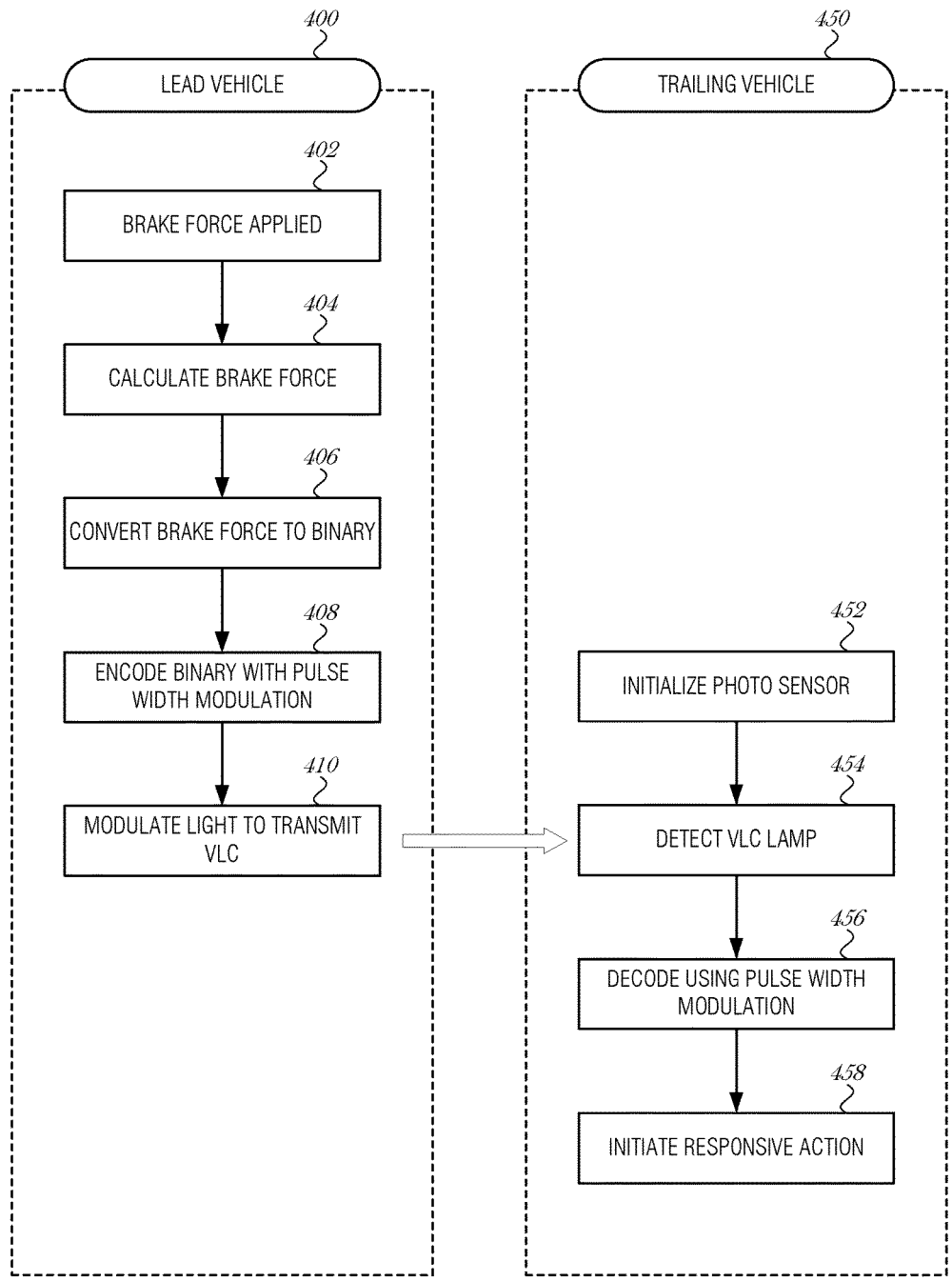
FIG. 4 is a swim lane diagram illustrating an interaction between a lead vehicle and a trailing vehicle, according to an embodiment.

FIG. 4 is a swim lane diagram illustrating an interaction between a lead vehicle 400 and a trailing vehicle 450, according to an embodiment. In this example, the lead vehicle 400 may be the ego vehicle 304 of FIG. 3. The lead vehicle 400 is equipped with a VLC communication system that communicates with a dedicated VLC lamp or using existing lights on the vehicle 400, such as the brake lights. When a brake force is applied (operation 402), a braking force is calculated (operation 404). The brake force may be applied by a driver (e.g., by pressing a brake pedal) or autonomously (e.g., by the vehicle to autonomously slow or stop the vehicle).

The brake force may be calculated using various units or contexts, for example, it may indicate the actual force applied to a brake pedal, the amount of deceleration of the vehicle, the amount of force a brake pad is applied to a caliper, or other measurements. While brake force applied at the pedal may indicate an amount of excitement the driver is experiencing, the actual deceleration of the vehicle may be markedly different. For instance, while on ice or snow, the vehicle deceleration may be largely affected. A vehicle or driver that is following the lead vehicle may want to know one or both of the actual force applied at the pedal (e.g., normalized to an easy-to-understand scale), and the amount of vehicle deceleration. Each provides different information, but both are useful.

Braking force is converted to binary (operation 406) and encoded using pulse width modulation (PWM) (operation 408). An example of PWM includes using a high-lumination value for a certain period (e.g., ten nanoseconds) as a binary one, and a low-lumination value for a certain period (e.g., ten nanoseconds) as a binary zero. It is understood that other illumination patters and lumination values may be used to encode information. For instance, variable pulse position modulation (VPPM), multiple pulse position modulation (MPPM), or a form of Manchester coding, may be used to encode the message. A message is transmitted to the trailing vehicle using modulated lights (operation 410).

The message may include the brake force along with other information. For instance, the message may include a maximum number of hops, a time-to-live (TTL), a maximum number of views, maximum queue length, or other message expiration data. For example, the initial emitting vehicle may encode a maximum queue length value of five with the brake force, to indicate that up to five vehicles may view the brake force data. When a vehicle consumes the brake force data and then re-emits it to further trailing vehicles, the consuming vehicle may decrement the value by one.

Alternatively, the initial emitting vehicle may encode a TTL value of three seconds, so that the message may be propagated from vehicle-to-vehicle for up to three seconds before the message expires. The TTL may be measured by some agreed-upon unit, such as second, milliseconds, etc. The TTL value may be reduced by an estimated time a system takes to receive a VLC message, process it, and active a VLC lamp to propagate the message.

At the trailing vehicle 450, a photo sensor is initialized (operation 452) and is used to detect the brake light or other VLC lamp (operation 454). The VLC message is received and decoded (operation 456), and an appropriate action is initiated (operation 458). The action may be applying brakes of the trailing vehicle 450, providing an alert to the driver of the trailing vehicle 450, propagating a VLC message to further trailing vehicles, or the like. The propagated VLC message may include the lead vehicle's brake force, the trailing vehicle's brake force, a TTL or other expiration data, along with other data.

For instance, in addition to transmitting brake force and expiration data, the VLC message may include data regarding vehicle speed (either of the ego vehicle or another vehicle), distance to an object (e.g., distance to a hazard), a hazard type (e.g., encoded to indicate an accident, object in the road, pothole or other road defect, etc.), and the like.

Figure 5:
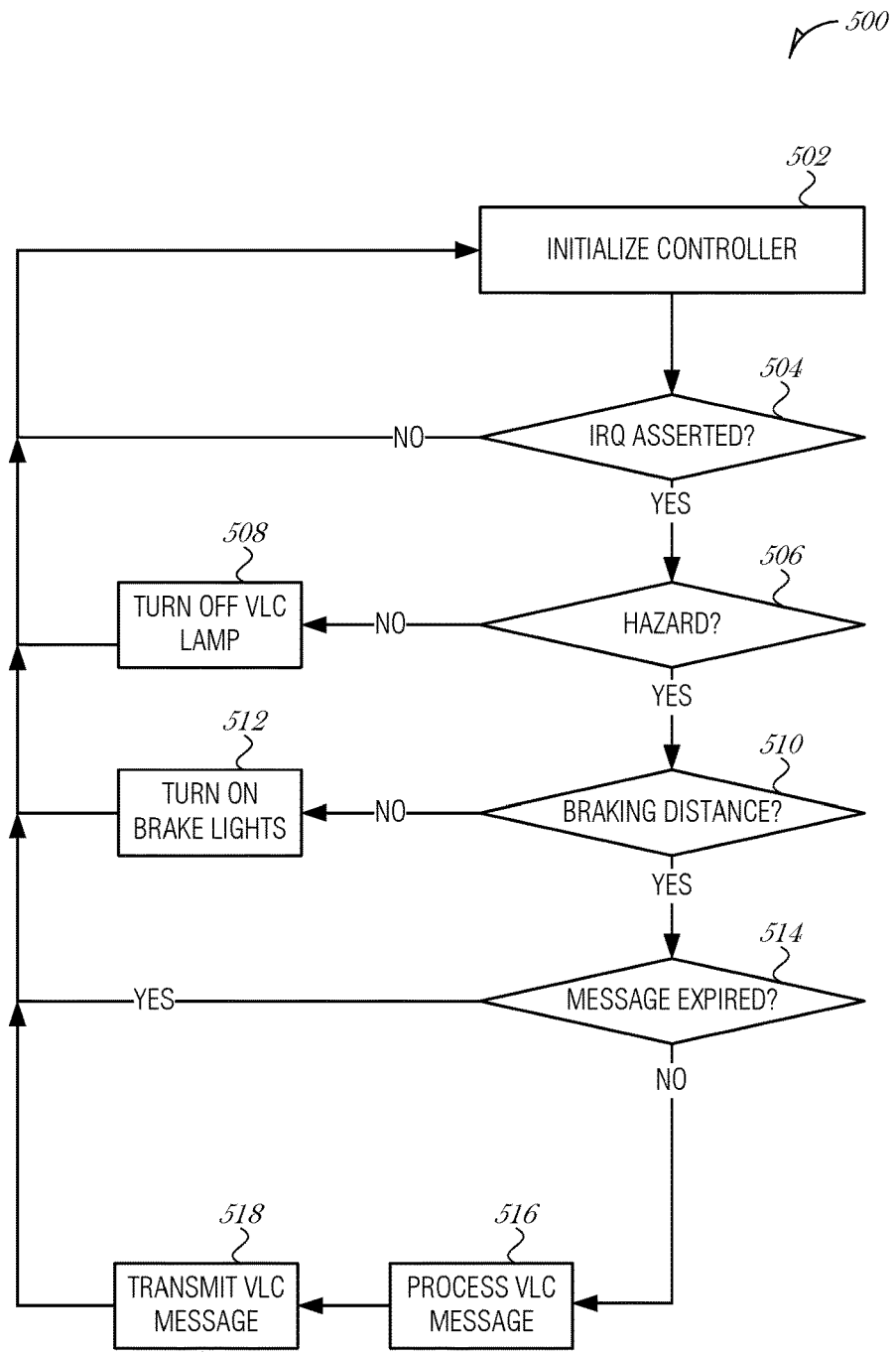
FIG. 5 is a flowchart illustrating a method for using VLC, according to an embodiment.

FIG. 5 is a flowchart illustrating a method 500 for using VLC, according to an embodiment. The method 500 initializes at 502, where a controller is initialized. The controller may be a vehicle controller subsystem 102, as described in FIG. 1. At 504, an IRQ is detected. IRQs may be used to indicate a hazardous situation (e.g., detection of brake lights in a lead vehicle, an obstacle in the road, etc.) and a safe situation (e.g., after the ego vehicle has passed an obstacle in the road). Based on the IRQ, it is determined whether there is a hazard ahead of the ego vehicle (decision block 506). For instance, the IRQ may be used to indicate that a dangerous situation has passed. In this case, the rear-facing VLC lamp is turned off (operation 508).

For instance, the IRQ may indicate that brake lights are detected. In this case, there is a hazard detected (e.g., braking vehicle) and the flow continues to decision block 510, where it is determined whether there is sufficient distance to brake the ego vehicle to avoid a collision. If there is insufficient distance, then the flow continues to 512, where the brake lights are activated and the brakes are applied to mitigate the damage.

If there is sufficient distance to stop before encountering the hazard and a VLC message has been received from the lead vehicle, then flow continues to decision block 514 where it is determined whether the VLC message has expired. If the VLC has not expired, then the flow continues to operation 516, where the VLC message is processed and a cascaded VLC message is emitted (operation 518). Flow returns to block 502, where additional IRQs are processed.

Processing the VLC message in block 516 may include determining how long a VLC message should persist in a V2V, V2X, V2I, or I2V network. For instance, the VLC message may be associated with a queue length indicating how many vehicles should view the message before it expires. In another example, the VLC message may be associated with a TTL. The length of a queue or a timeout for a TTL, or other expiration mechanism, may be predicated on operating context of the ego vehicle, the initial emitting vehicle, or other conditions.

In an embodiment, the initial emitting calculates a TTL and transmits a representation of this value with the VLC message. Calculating a TTL is complex and may include use of machine learning, rule-based heuristics, or other artificial intelligence. For example, in snowy or icy conditions, the braking distances of the vehicles is increased. In this situation, it is important that the VLC message is sent through a large number of vehicles to ensure that they all brake in time. In dry conditions, where braking distances are shorter, this is less of an issue. Here, the message may be sent through fewer vehicles. It is also important in dry condition that the message is not sent to a large number of vehicles as many vehicles may needlessly apply their brakes. As such, the vehicle that encounters the hazard is responsible for setting a TTL for the VLC message. The vehicle may calculate this TTL based on distance to the hazard, measured weather conditions, or "smart city" information such as visibility or snowy/icy conditions. The TTL may added to the header of the VLC message and then transmitted to following vehicles. Each vehicle in the queue would decrement the TTL before passing on the VLC message. Vehicles may decrement based on an estimated time it takes to receive and process the VLC message.

A similar mechanism may be used to set a queue length. The queue length indicates a number of vehicles that will be served the VLC message or that will be expected to pass along the VLC message. The queue length may be longer for difficult driving conditions, e.g., during a snow storm, and shorter for easier driving conditions, e.g., sunny dry day.

Figure 6A:
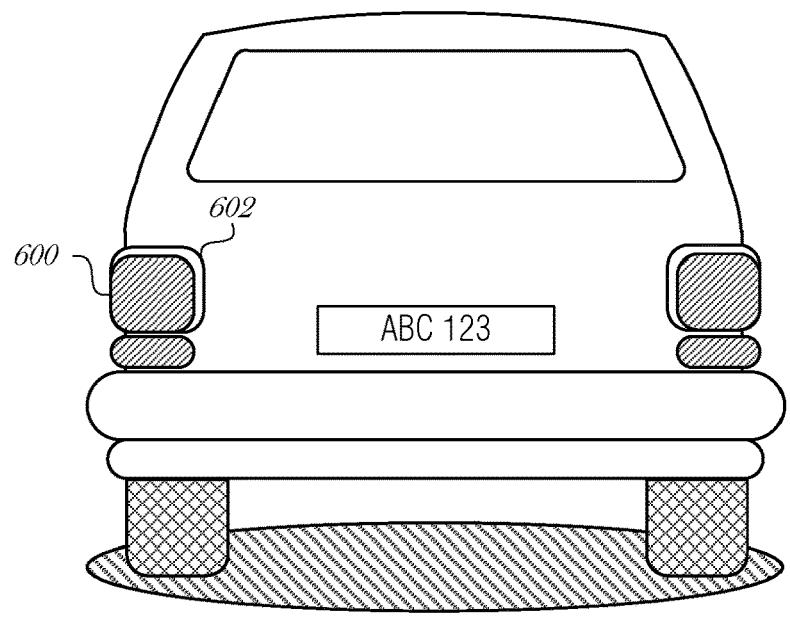
FIGS. 6A and 6B are illustrations of rear-facing presentations, according to various embodiments.
Figure 6B:
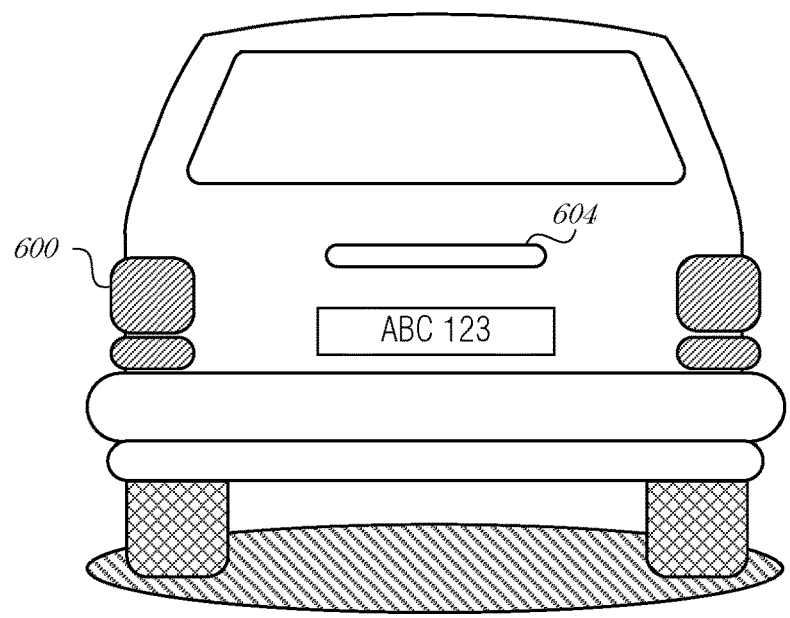

FIGS. 6A and 6B are illustrations of rear-facing presentations, according to various embodiments. In FIG. 6A, a taillight cluster 600 is modified with an additional light 602 around the outside of the cluster 600. The additional light 602 may illuminate to transmit a VLC message. The additional light 602 may illuminate in a variety of ways, such as with a particular blinking pattern, with a different colored light (e.g., blue) than the regular brake lights in the taillight cluster 600, with a different intensity than that of the brake light, or the like.

FIG. 6B illustrates another rear-facing presentation where a warning light 604 is affixed to the vehicle. The warning light 604 may be close to the taillight cluster 600 or apart from it, based on the implementation. As with other embodiments in FIG. 6A, the warning light 604 may use flashing lights, colors, text, or other visual stimuli to attract the attention of the operator of a trailing vehicle, and transmit a VLC message.

Optionally, instead of using a modified taillight, additional light, or other display technology, the existing taillights 600 may be adapted to be used as the warning light. For instance, existing brake lights may be flashed using a certain blinking pattern to attract attention and signal a dangerous situation to a trailing vehicle or operator behind the vehicle. The blinking pattern may be used to attract human attention while a VLC message is encoded in non-human-perceivable light modulation for VLC. Many vehicles include a third brake light in a high position, usually in a rear window or above the frame of the rear window. This third brake light may be used to transmit VLC messages.

Figure 7:
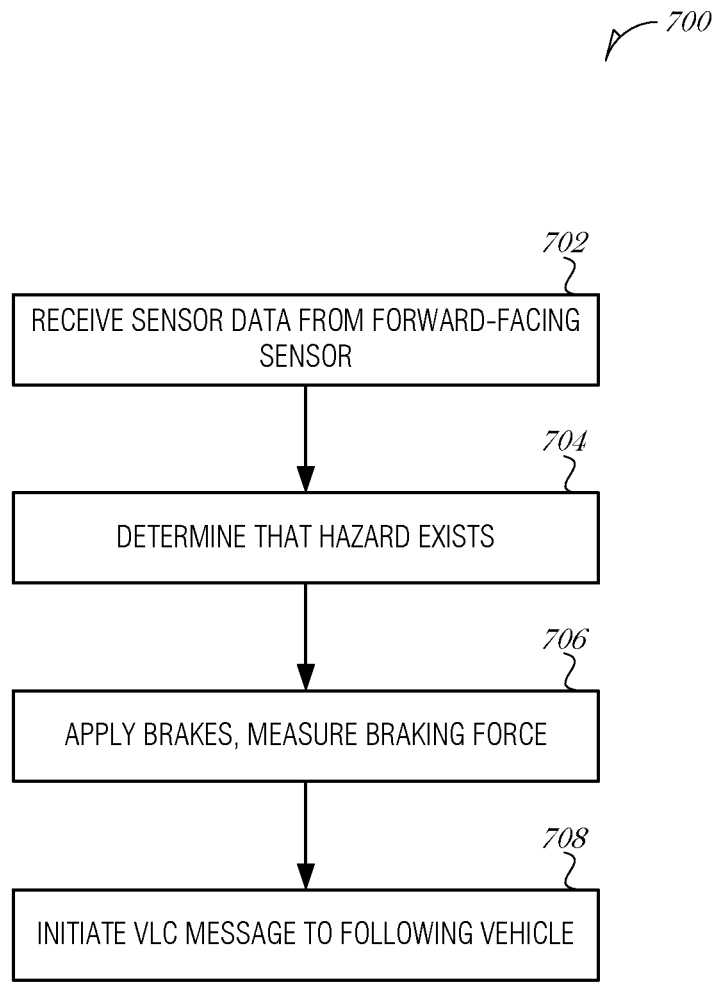
FIG. 7 is a flowchart illustrating a method for a lead vehicle to provide a VLC message to a trailing vehicle behind the lead vehicle, according to an embodiment.

FIG. 7 is a flowchart illustrating a method 700 for a lead vehicle to provide a VLC message to a trailing vehicle behind the lead vehicle, according to an embodiment. At 702, sensor data from a forward-facing sensor incorporated into the lead vehicle is received from a sensor array interface.

At 704, it is determined from the sensor data, using a processor, that a hazard exists. In an embodiment, the forward-facing sensor includes a visible light camera. In another embodiment, the forward-facing sensor includes a light ranging sensor. In another embodiment, the forward-facing sensor includes a radar sensor.

In an embodiment, the hazard includes a vehicle collision. In another embodiment, the hazard includes a vehicle brake lights. In another embodiment, the hazard includes a road fault. In a further embodiment, the road fault includes a pothole. In a related embodiment, the hazard includes a pedestrian.

At 706, the application of brakes is initiated with a braking force. In an embodiment, the braking force represents the force applied to a brake pedal of the lead vehicle. In another embodiment, the braking force represents a deceleration of the lead vehicle.

At 708, a VLC message to the trailing vehicle is initiated, via a light controller, the VLC message including the braking force. In an embodiment, initiating the VLC message includes converting the braking force to a binary representation, encoding the binary representation, and presenting the VLC message using the pulse width modulation encoded binary representation. In a further embodiment, encoding the binary representation includes encoding the binary representation using pulse width modulation.

In an embodiment, initiating the VLC message includes calculating a VLC message expiration and encoding the VLC message expiration in the VLC message. In a further embodiment, the VLC message expiration is a queue length representing a number of vehicles able to view the VLC message. In another embodiment, the VLC message expiration is a time to live (TTL) value.

In an embodiment, calculating the VLC message expiration includes identifying a vehicle operating context and setting a time to live (TTL) value based on the vehicle operating context. In a further embodiment, the vehicle operating context indicates that the lead vehicle is operating in more difficult operating context, and the method 700 includes setting the TTL value higher based on the more difficult operating context. In another embodiment, the vehicle operating context indicates that the lead vehicle is operating in less difficult operating context, and the method 700 includes setting the TTL value lower based on the less difficult operating context.

In an embodiment, initiating the VLC message includes initiating an illumination pattern on a taillight cluster of the lead vehicle.

In another embodiment, initiating the VLC message includes illuminating a light that is not a part of a taillight and not a part of a third-brake light assembly of the lead vehicle.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 8:
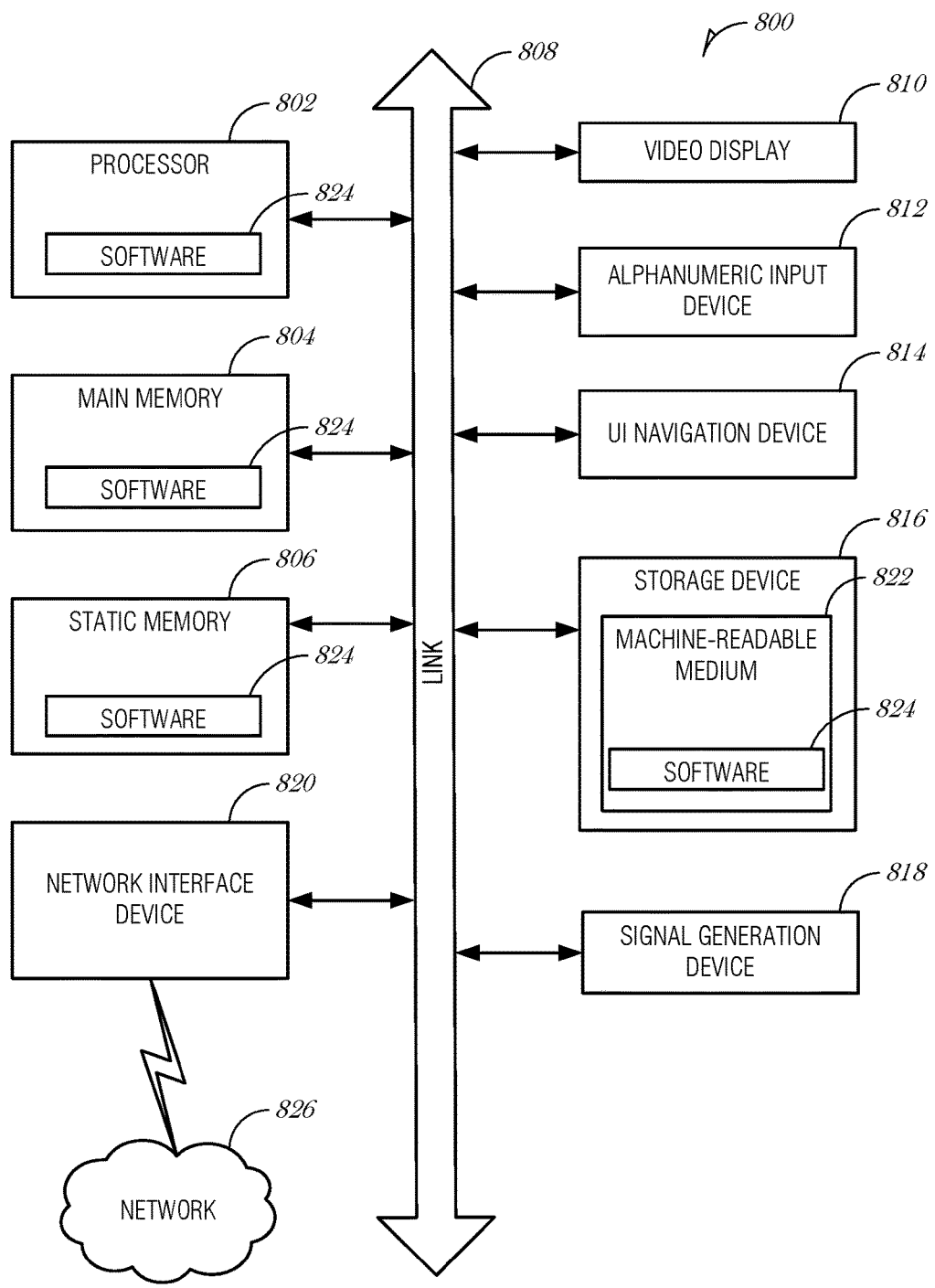
FIG. 8 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 8 is a block diagram illustrating a machine in the example form of a computer system 800, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a system for a lead vehicle to provide a visible light communication (VLC) message to a trailing vehicle behind the lead vehicle, the system comprising: a vehicle controller subsystem of the lead vehicle, to: receive from a sensor array interface, sensor data from a forward-facing sensor incorporated into the lead vehicle; determine, using a processor, from the sensor data that a hazard exists; initiate the application of brakes with a braking force; and initiate, via a light controller, a VLC message to the trailing vehicle, the VLC message including the braking force.

In Example 2, the subject matter of Example 1 includes, wherein the forward-facing sensor includes a visible light camera.

In Example 3, the subject matter of Examples 1-2 includes, wherein the forward-facing sensor includes a light ranging sensor.

In Example 4, the subject matter of Examples 1-3 includes, wherein the forward-facing sensor includes a radar sensor.

In Example 5, the subject matter of Examples 1-4 includes, wherein the hazard includes a vehicle collision.

In Example 6, the subject matter of Examples 1-5 includes, wherein the hazard includes a vehicle brake lights.

In Example 7, the subject matter of Examples 1-6 includes, wherein the hazard includes a road fault.

In Example 8, the subject matter of Example 7 includes, wherein the road fault includes a pothole.

In Example 9, the subject matter of Examples 1-8 includes, wherein the hazard includes a pedestrian.

In Example 10, the subject matter of Examples 1-9 includes, wherein the braking force represents the force applied to a brake pedal of the lead vehicle.

In Example 11, the subject matter of Examples 1-10 includes, wherein the braking force represents a deceleration of the lead vehicle.

In Example 12, the subject matter of Examples 1-11 includes, wherein to initiate the VLC message, the vehicle controller subsystem is to: convert the braking force to a binary representation; encode the binary representation; and present the VLC message using the pulse width modulation encoded binary representation.

In Example 13, the subject matter of Example 12 includes, wherein the binary representation is encoded using pulse width modulation.

In Example 14, the subject matter of Examples 1-13 includes, wherein to initiate the VLC message, the vehicle controller subsystem is to: calculate a VLC message expiration; and encode the VLC message expiration in the VLC message.

In Example 15, the subject matter of Example 14 includes, wherein the VLC message expiration is a queue length representing a number of vehicles able to view the VLC message.

In Example 16, the subject matter of Examples 14-15 includes, wherein the VLC message expiration is a time to live (TTL) value.

In Example 17, the subject matter of Examples 14-16 includes, wherein to calculate the VLC message expiration, the vehicle controller subsystem is to: identify a vehicle operating context; and set a time to live (TTL) value based on the vehicle operating context.

In Example 18, the subject matter of Example 17 includes, wherein the vehicle operating context indicates that the lead vehicle is operating in more difficult operating context, and wherein the vehicle controller subsystem sets the TTL value higher based on the more difficult operating context.

In Example 19, the subject matter of Examples 17-18 includes, wherein the vehicle operating context indicates that the lead vehicle is operating in less difficult operating context, and wherein the vehicle controller subsystem sets the TTL value lower based on the less difficult operating context.

In Example 20, the subject matter of Examples 1-19 includes, wherein to initiate the VLC message, the light controller is to initiate an illumination pattern on a taillight cluster of the lead vehicle.

In Example 21, the subject matter of Examples 1-20 includes, wherein to initiate the VLC message, the light controller is to illuminate a light that is not a part of a taillight and not a part of a third-brake light assembly of the lead vehicle.

Example 22 is a method for a lead vehicle to provide a visible light communication (VLC) message to a trailing vehicle behind the lead vehicle, the method comprising: receiving from a sensor array interface, sensor data from a forward-facing sensor incorporated into the lead vehicle; determining, using a processor, from the sensor data that a hazard exists; initiating the application of brakes with a braking force; and initiating, via a light controller, a VLC message to the trailing vehicle, the VLC message including the braking force.

In Example 23, the subject matter of Example 22 includes, wherein the forward-facing sensor includes a visible light camera.

In Example 24, the subject matter of Examples 22-23 includes, wherein the forward-facing sensor includes a light ranging sensor.

In Example 25, the subject matter of Examples 22-24 includes, wherein the forward-facing sensor includes a radar sensor.

In Example 26, the subject matter of Examples 22-25 includes, wherein the hazard includes a vehicle collision.

In Example 27, the subject matter of Examples 22-26 includes, wherein the hazard includes a vehicle brake lights.

In Example 28, the subject matter of Examples 22-27 includes, wherein the hazard includes a road fault.

In Example 29, the subject matter of Example 28 includes, wherein the road fault includes a pothole.

In Example 30, the subject matter of Examples 22-29 includes, wherein the hazard includes a pedestrian.

In Example 31, the subject matter of Examples 22-30 includes, wherein the braking force represents the force applied to a brake pedal of the lead vehicle.

In Example 32, the subject matter of Examples 22-31 includes, wherein the braking force represents a deceleration of the lead vehicle.

In Example 33, the subject matter of Examples 22-32 includes, wherein initiating the VLC message comprises: converting the braking force to a binary representation; encoding the binary representation; and presenting the VLC message using the pulse width modulation encoded binary representation.

In Example 34, the subject matter of Example 33 includes, wherein encoding the binary representation comprises encoding the binary representation using pulse width modulation.

In Example 35, the subject matter of Examples 22-34 includes, wherein initiating the VLC message comprises: calculating a VLC message expiration; and encoding the VLC message expiration in the VLC message.

In Example 36, the subject matter of Example 35 includes, wherein the VLC message expiration is a queue length representing a number of vehicles able to view the VLC message.

In Example 37, the subject matter of Examples 35-36 includes, wherein the VLC message expiration is a time to live (TTL) value.

In Example 38, the subject matter of Examples 35-37 includes, wherein calculating the VLC message expiration comprises: identifying a vehicle operating context; and setting a time to live (TTL) value based on the vehicle operating context.

In Example 39, the subject matter of Example 38 includes, wherein the vehicle operating context indicates that the lead vehicle is operating in more difficult operating context, and wherein the method comprises: setting the TTL value higher based on the more difficult operating context.

In Example 40, the subject matter of Examples 38-39 includes, wherein the vehicle operating context indicates that the lead vehicle is operating in less difficult operating context, and wherein the method comprises: setting the TTL value lower based on the less difficult operating context.

In Example 41, the subject matter of Examples 22-40 includes, wherein initiating the VLC message comprises initiating an illumination pattern on a taillight cluster of the lead vehicle.

In Example 42, the subject matter of Examples 22-41 includes, wherein initiating the VLC message comprises illuminating a light that is not a part of a taillight and not a part of a third-brake light assembly of the lead vehicle.

Example 43 is at least one machine-readable medium including instructions, which when executed by a machine, cause the machine to perform operations of any of the methods of Examples 22-42.

Example 44 is an apparatus comprising means for performing any of the methods of Examples 22-42.

Example 45 is an apparatus for a lead vehicle to provide a visible light communication (VLC) message to a trailing vehicle behind the lead vehicle, the apparatus comprising: means for receiving from a sensor array interface, sensor data from a forward-facing sensor incorporated into the lead vehicle; means for determining, using a processor, from the sensor data that a hazard exists; means for initiating the application of brakes with a braking force; and means for initiating, via a light controller, a VLC message to the trailing vehicle, the VLC message including the braking force.

In Example 46, the subject matter of Example 45 includes, wherein the forward-facing sensor includes a visible light camera.

In Example 47, the subject matter of Examples 45-46 includes, wherein the forward-facing sensor includes a light ranging sensor.

In Example 48, the subject matter of Examples 45-47 includes, wherein the forward-facing sensor includes a radar sensor.

In Example 49, the subject matter of Examples 45-48 includes, wherein the hazard includes a vehicle collision.

In Example 50, the subject matter of Examples 45-49 includes, wherein the hazard includes a vehicle brake lights.

In Example 51, the subject matter of Examples 45-50 includes, wherein the hazard includes a road fault.

In Example 52, the subject matter of Example 51 includes, wherein the road fault includes a pothole.

In Example 53, the subject matter of Examples 45-52 includes, wherein the hazard includes a pedestrian.

In Example 54, the subject matter of Examples 45-53 includes, wherein the braking force represents the force applied to a brake pedal of the lead vehicle.

In Example 55, the subject matter of Examples 45-54 includes, wherein the braking force represents a deceleration of the lead vehicle.

In Example 56, the subject matter of Examples 45-55 includes, wherein the means for initiating the VLC message comprise: means for converting the braking force to a binary representation; means for encoding the binary representation; and means for presenting the VLC message using the pulse width modulation encoded binary representation.

In Example 57, the subject matter of Example 56 includes, wherein the means for encoding the binary representation comprise means for encoding the binary representation using pulse width modulation.

In Example 58, the subject matter of Examples 45-57 includes, wherein the means for initiating the VLC message comprises: means for calculating a VLC message expiration; and means for encoding the VLC message expiration in the VLC message.

In Example 59, the subject matter of Example 58 includes, wherein the VLC message expiration is a queue length representing a number of vehicles able to view the VLC message.

In Example 60, the subject matter of Examples 58-59 includes, wherein the VLC message expiration is a time to live (TTL) value.

In Example 61, the subject matter of Examples 58-60 includes, wherein the means for calculating the VLC message expiration comprise: means for identifying a vehicle operating context; and means for setting a time to live (TTL) value based on the vehicle operating context.

In Example 62, the subject matter of Example 61 includes, wherein the vehicle operating context indicates that the lead vehicle is operating in more difficult operating context, and wherein the apparatus comprises: means for setting the TTL value higher based on the more difficult operating context.

In Example 63, the subject matter of Examples 61-62 includes, wherein the vehicle operating context indicates that the lead vehicle is operating in less difficult operating context, and wherein the apparatus comprises: means for setting the TTL value lower based on the less difficult operating context.

In Example 64, the subject matter of Examples 45-63 includes, wherein the means for initiating the VLC message comprise means for initiating an illumination pattern on a taillight cluster of the lead vehicle.

In Example 65, the subject matter of Examples 45-64 includes, wherein the means for initiating the VLC message comprise means for illuminating a light that is not a part of a taillight and not a part of a third-brake light assembly of the lead vehicle.

Example 66 is at least one machine-readable medium including instructions for a lead vehicle to provide a visible light communication (VLC) message to a trailing vehicle behind the lead vehicle, the instructions when executed by a machine, cause the machine to perform operations comprising: receiving from a sensor array interface, sensor data from a forward-facing sensor incorporated into the lead vehicle; determining, using a processor, from the sensor data that a hazard exists; initiating the application of brakes with a braking force; and initiating, via a light controller, a VLC message to the trailing vehicle, the VLC message including the braking force.

In Example 67, the subject matter of Example 66 includes, wherein the forward-facing sensor includes a visible light camera.

In Example 68, the subject matter of Examples 66-67 includes, wherein the forward-facing sensor includes a light ranging sensor.

In Example 69, the subject matter of Examples 66-68 includes, wherein the forward-facing sensor includes a radar sensor.

In Example 70, the subject matter of Examples 66-69 includes, wherein the hazard includes a vehicle collision.

In Example 71, the subject matter of Examples 66-70 includes, wherein the hazard includes a vehicle brake lights.

In Example 72, the subject matter of Examples 66-71 includes, wherein the hazard includes a road fault.

In Example 73, the subject matter of Example 72 includes, wherein the road fault includes a pothole.

In Example 74, the subject matter of Examples 66-73 includes, wherein the hazard includes a pedestrian.

In Example 75, the subject matter of Examples 66-74 includes, wherein the braking force represents the force applied to a brake pedal of the lead vehicle.

In Example 76, the subject matter of Examples 66-75 includes, wherein the braking force represents a deceleration of the lead vehicle.

In Example 77, the subject matter of Examples 66-76 includes, wherein initiating the VLC message comprises: converting the braking force to a binary representation; encoding the binary representation; and presenting the VLC message using the pulse width modulation encoded binary representation.

In Example 78, the subject matter of Example 77 includes, wherein encoding the binary representation comprises encoding the binary representation using pulse width modulation.

In Example 79, the subject matter of Examples 66-78 includes, wherein initiating the VLC message comprises: calculating a VLC message expiration; and encoding the VLC message expiration in the VLC message.

In Example 80, the subject matter of Example 79 includes, wherein the VLC message expiration is a queue length representing a number of vehicles able to view the VLC message.

In Example 81, the subject matter of Examples 79-80 includes, wherein the VLC message expiration is a time to live (TTL) value.

In Example 82, the subject matter of Examples 79-81 includes, wherein calculating the VLC message expiration comprises: identifying a vehicle operating context; and setting a time to live (TTL) value based on the vehicle operating context.

In Example 83, the subject matter of Example 82 includes, wherein the vehicle operating context indicates that the lead vehicle is operating in more difficult operating context, and wherein the machine-readable medium comprises instructions for: setting the TTL value higher based on the more difficult operating context.

In Example 84, the subject matter of Examples 82-83 includes, wherein the vehicle operating context indicates that the lead vehicle is operating in less difficult operating context, and wherein the machine-readable medium comprises instructions for: setting the TTL value lower based on the less difficult operating context.

In Example 85, the subject matter of Examples 66-84 includes, wherein initiating the VLC message comprises initiating an illumination pattern on a taillight cluster of the lead vehicle.

In Example 86, the subject matter of Examples 66-85 includes, wherein initiating the VLC message comprises illuminating a light that is not a part of a taillight and not a part of a third-brake light assembly of the lead vehicle.

Example 87 is at least one machine-readable medium including instructions that, when executed by a processor subsystem, cause the processor subsystem to perform operations to implement of any of Examples 1-86.

Example 88 is an apparatus comprising means to implement of any of Examples 1-86.

Example 89 is a system to implement of any of Examples 1-86.

Example 90 is a method to implement of any of Examples 1-86.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for a lead vehicle to provide a visible light communication (VLC) message to a trailing vehicle behind the lead vehicle, the system comprising:
   a vehicle controller subsystem of the lead vehicle, to:
   receive from a sensor array interface, sensor data from a forward-facing sensor incorporated into the lead vehicle;
   determine, using a processor, from the sensor data that a hazard exists;
   initiate the application of brakes with a braking force; and
   initiate, via a light controller, a VLC message to the trailing vehicle, the VLC message including the braking force, wherein to initiate the VLC message, the vehicle controller subsystem is to:
   convert the braking fore to a binary representation;
   encode the binary representation; and
   present the VLC message using the pulse width modulation encoded binary representation.

2. The system of claim 1, wherein the braking force represents a deceleration of the lead vehicle.

3. The system of claim 1, wherein the binary representation is encoded using pulse width modulation.

4. The system of claim 1, wherein to initiate the VLC message, the vehicle controller subsystem is to:
   calculate a VLC message expiration; and
   encode the VLC message expiration in the VLC message.

5. The system of claim 4, wherein the VLC message expiration is a queue length representing a number of vehicles able to view the VLC message.

6. The system of claim 4, wherein the VLC message expiration is a time to live (TTL) value.

7. The system of claim 4, wherein to calculate the VLC message expiration, the vehicle controller subsystem is to:
identify a vehicle operating context; and
set a time to live (TTL) value based on the vehicle operating context.

8. The system of claim 7, wherein the vehicle operating context indicates that the lead vehicle is operating in more difficult operating context, and wherein the vehicle controller subsystem sets the TTL value higher based on the more difficult operating context.

9. The system of claim 7, wherein the vehicle operating context indicates that the lead vehicle is operating in less difficult operating context, and wherein the vehicle controller subsystem sets the TTL value lower based on the less difficult operating context.

10. The system of claim 1, wherein to initiate the VLC message, the light controller is to initiate an illumination pattern on a taillight cluster of the lead vehicle.

11. The system of claim 1, wherein to initiate the VLC message, the light controller is to illuminate a light that is not a part of a taillight and not a part of a third-brake light assembly of the lead vehicle.

12. The system of claim 1, wherein the braking force represents the force applied to a brake pedal of the lead vehicle.

13. A method for a lead vehicle to provide a visible light communication (VLC) message to a trailing vehicle behind the lead vehicle, the method comprising:
receiving from a sensor array interface, sensor data from a forward-facing sensor incorporated into the lead vehicle;
determining, using a processor, from the sensor data that a hazard exists;
initiating the application of brakes with a braking force; and
initiating, via a light controller, a VLC message to the trailing vehicle, the VLC message including the braking force,
wherein initiating the VLC message comprises:
converting the braking force to a binary representation;
encoding the binary representation; and
presenting the VLC message using a pulse width modulation encoded binary representation.

14. The method of claim 13, wherein the hazard includes a vehicle collision.

15. The method of claim 13, wherein the hazard includes vehicle brake lights.

16. The method of claim 13, wherein the braking force represents the force applied to a brake pedal of the lead vehicle.

17. The method of claim 13, wherein the braking force represents a deceleration of the lead vehicle.

18. The method of claim 13, wherein encoding the binary representation comprises encoding the binary representation using pulse width modulation.

19. The method of claim 13, wherein initiating the VLC message comprises:
calculating a VLC message expiration; and
encoding the VLC message expiration in the VLC message.

20. At least one non-transitory machine-readable medium including instructions for a lead vehicle to provide a visible light communication (VLC) message to a trailing vehicle behind the lead vehicle, the instructions when executed by a machine, cause the machine to perform operations comprising:
receiving from a sensor array interface, sensor data from a forward-facing sensor incorporated into the lead vehicle;
determining, using a processor, from the sensor data that a hazard exists;
initiating the application of brakes with a braking force; and
initiating, via a light controller, a VLC message to the trailing vehicle, the VLC message including the braking force,
wherein initiating the VLC message comprises:
converting the braking force to a binary representation;
encoding the binary representation; and
presenting the VLC message using the pulse width modulation encoded binary representation.

21. The machine-readable medium of claim 20, wherein encoding the binary representation comprises encoding the binary representation using pulse width modulation.

22. The machine-readable medium of claim 20, wherein initiating the VLC message comprises:
calculating a VLC message expiration; and
encoding the VLC message expiration in the VLC message.

* * * * *

UNITED STATES PATENT AND TRADEMARK OFFICE
CERTIFICATE OF CORRECTION

PATENT NO. : 10,700,782 B2
APPLICATION NO. : 15/869525
DATED : June 30, 2020
INVENTOR(S) : Brady et al.

Page 1 of 1

It is certified that error appears in the above-identified patent and that said Letters Patent is hereby corrected as shown below:

In the Claims

In Column 18, Line 53, in Claim 1, delete "fore" and insert --force-- therefor

Signed and Sealed this
Twenty-second Day of December, 2020

Andrei Iancu
*Director of the United States Patent and Trademark Office*